July 18, 1950     H. E. RENAUD     2,516,091
METHOD OF MAKING TEMPLETS

Filed Nov. 27, 1946     5 Sheets-Sheet 1

INVENTOR
Harold E. Renaud

BY
Richard A. Parsons
ATTORNEY

July 18, 1950  H. E. RENAUD  2,516,091
METHOD OF MAKING TEMPLETS
Filed Nov. 27, 1946  5 Sheets-Sheet 2

INVENTOR
Harold E. Renaud
BY
Richard A. Parsons
ATTORNEY

July 18, 1950        H. E. RENAUD        2,516,091

METHOD OF MAKING TEMPLETS

Filed Nov. 27, 1946        5 Sheets-Sheet 3

INVENTOR
Harold E. Renaud
BY
Richard G. Parsons
ATTORNEY

July 18, 1950  H. E. RENAUD  2,516,091
METHOD OF MAKING TEMPLETS
Filed Nov. 27, 1946  5 Sheets-Sheet 4

INVENTOR
Harold E. Renaud
BY
Richard A. Parsons
ATTORNEY

July 18, 1950  H. E. RENAUD  2,516,091
METHOD OF MAKING TEMPLETS

Filed Nov. 27, 1946  5 Sheets-Sheet 5

INVENTOR
Harold E. Renaud
BY
*Richard A. Parsons*
ATTORNEY

Patented July 18, 1950

2,516,091

UNITED STATES PATENT OFFICE 2,516,091

METHOD OF MAKING TEMPLETS

Harold E. Renaud, Lansing, Mich., assignor to Renaud Plastics, Inc., Lansing, Mich., a corporation of Michigan Application November 27, 1946, Serial No. 712,525

3 Claims. (Cl. 18—55)

This invention relates to methods of making templets for three dimensional objects.

In large scale production manufacturing methods a relatively large number of templets for checking the finished pieces, as well as for use in assembling certain parts, are required. Heretofore such templets have largely been made separately by hand. Templets made in this way are exceedingly costly.

The principal object of the present invention is to provide a simple and very economical method of making such templets.

Another object of the invention is to provide a method of making templets of exceptional accuracy.

A still further object is to provide a simple and economical method of making a templet which will permit access to various parts of the piece to be checked so that checking thereof is facilitated.

A still further object is to provide a method of making a templet that will be light in weight but very rugged.

A further object of the invention is to provide a method of making from the same model, templets for checking inside of metal and templets for checking outside of metal dimensions.

These objects will more fully appear when read in connection with the accompanying drawings, wherein.

In the production manufacturing methods of sheet metal parts, after the original design is decided upon, accurate wooden models of all parts are made. Such models are usually constructed of mahogany which does not expand or shrink appreciably during normal climatic changes. The dies used in forming the sheet metal parts, and the checking templets, as well as many assembling jigs, are then constructed, using the wooden models as patterns.

Figure 1:
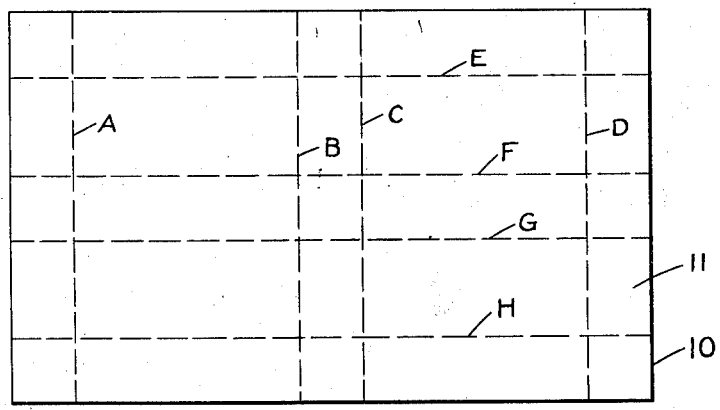
Figure 1 is a plan view of a wooden model.
Figure 2:
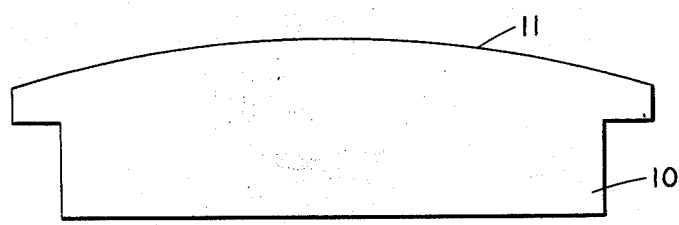
Figure 2 is a front elevational view of the model shown in Figure 1.
Figure 3:
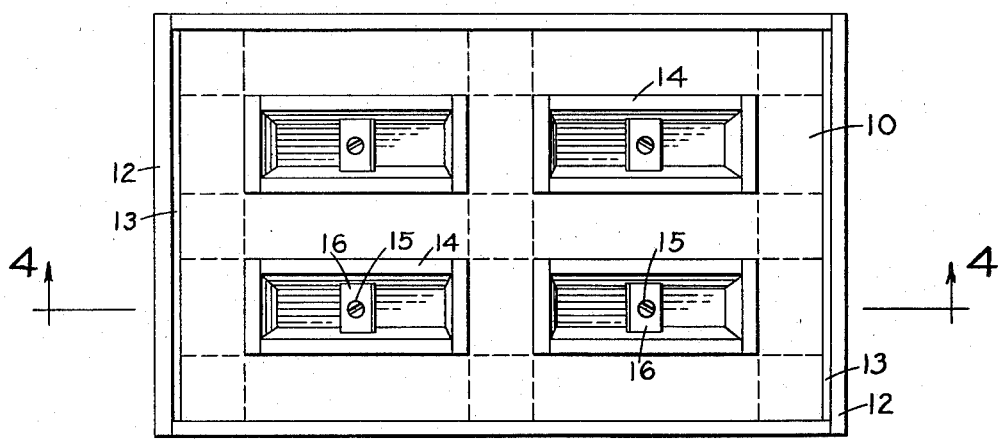
Figure 3 is a plan view of the wood model of Figures 1 and 2, showing forms in place thereon.
Figure 4:
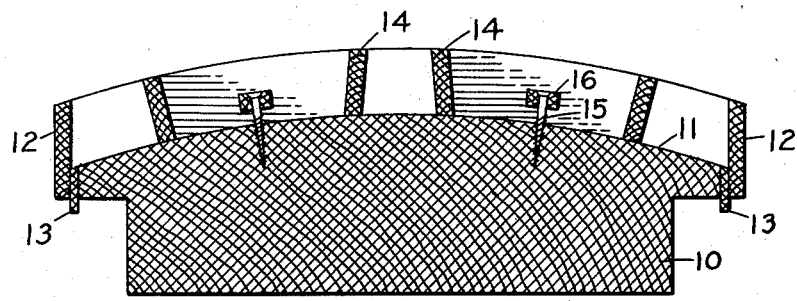
Figure 4 is a cross-sectional view taken on substantially the line 4—4 of Figure 3.
Figure 5:
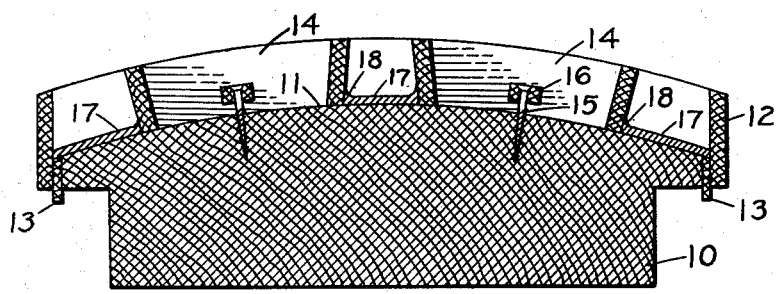
Figure 5 is a cross-sectional view similar to Figure 4 showing sheet wax in place.

Figures 1 and 2 illustrate such a wooden model 10. The upper curved surface, or working surface 11, of the model indicates the desired shape and size of the finished metal piece.

In constructing a templet according to the present invention, lines are marked in convenient locations on the working surface 11 of the model to indicate the locations of ribs of the templet. Such lines are indicated as broken lines A to H in Figure 1.

After the location layout is made on the model, upright walls are attached to the model which with the latter provide a form for plastic. An outside frame 12, preferably of wood, completely surrounds the model and is screwed or otherwise attached thereto. Between the ends of the model and the end section of the frame two thin strips 13 of wood are placed. These strips are utilized to make the plastic casting slightly longer than desired, so that the casting can be scraped down to exact size after the casting is removed from the forms.

Rectangular boxes 14 of wood are mounted on the working surface 11 of the model within the four elongated rectangles formed by the intersections of the lines A to H. Preferably the sides of the boxes 14 converge toward each other and toward the model slightly in order to facilitate their removal from the finished templet. The lower edges of the boxes conform quite closely to the working surface of the model. The boxes are secured to the model by screws 15 extending through struts 16 securely attached inside of the boxes.

Because the templet to be made is for checking "outside of metal" thin sheets of wax 17 are laid on the working surface of the model in the spaces between the boxes 14 and the side frame 12. The wax sheets are equal to the metal thickness of the part to be checked by templet. The junction of the wax sheets and the boxes 14 are filleted with additional wax as illustrated at 18, in order to eliminate seepage of plastic when the latter is in its fluid state.

All surfaces which come in contact with plastic, namely the upper surfaces of the wax sheets and adjacent surfaces of frame 12 and boxes 14 are sprayed with lacquer. They are then covered with a thin coating of a wax parting agent and polished.

Figure 6:
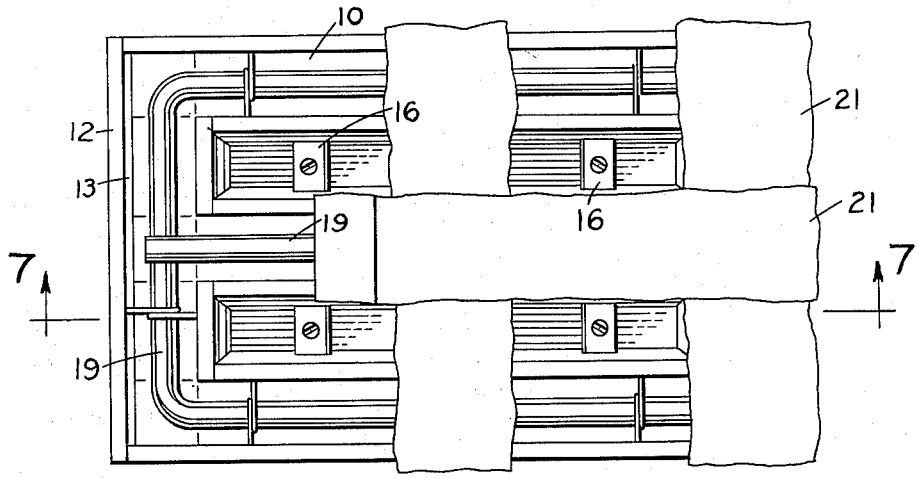
Figure 6 is a plan view similar to Figure 3 showing the tops of the forms partially covered with canvas.
Figure 7:
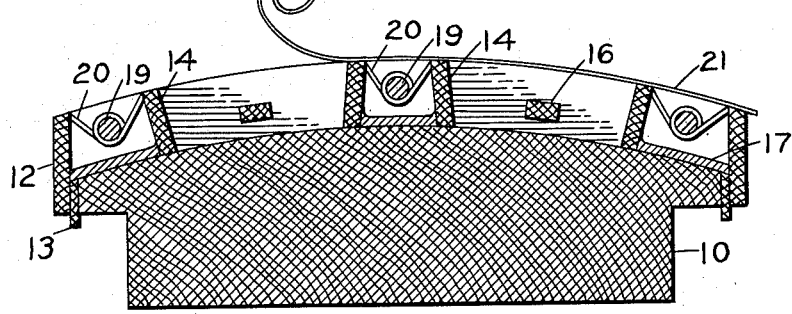
Figure 7 is a cross-sectional view taken on substantially the line 7—7 of Figure 6.

Preferably the templet is reinforced. To this end, metal bars 19 are bent to the desired configuration (see Figures 6 and 7) and hung within the spaces to be filled with plastic in spaced relation to the walls thereof, by means of twine 20 or other suitable means. The twine 20 is looped around the bars and tacked to the boxes 14 and frame 12. Prior to mounting the reinforcing bars, the latter are coated with a suitable material which prevents contact between the plastic and the metal, and thereby eliminates any possible chemical reaction between them. Preferably a material known as "Vinylseal" is employed for the purpose.

The tops of the spaces to be filled with plastic are then partially covered with strips of canvas 21. The strips are cut large enough to completely cover the spaces, but at this stage of the process only part of the canvas is tacked down, leaving sprue openings near the center into which the fluid plastic may be poured. The canvas is heavily coated on the inside with a mixture of tallow and wax. Preferably this coating is applied prior to attaching the canvas to the form.

The spaces between the boxes and the end frame are then filled with plastic 22 by pouring the same, while in fluid form, into the sprue openings. The plastic employed is a thermosetting phenolic resin which can be poured in liquid form. Care is taken in mixing and pouring the plastic to eliminate air bubbles as much as possible, as the presence of air bubbles will cause variations in the shrinkage of the completed templet.

The sprue openings are closed with the remaining canvas, and the form and the plastic contained therein are placed in an oven and baked at about 150° F. During the baking period the plastic is solidified and cured. The baking period depends to a large extent on the size of the piece being treated, as well as on the temperature of the oven.

Figure 8:
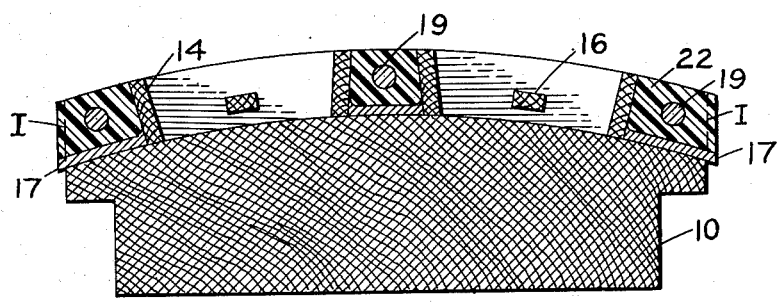
Figure 8 is a cross-sectional view similar to Figure 7 after the plastic templet has been cast and cured, and the side frame of the form has been removed.
Figure 9:
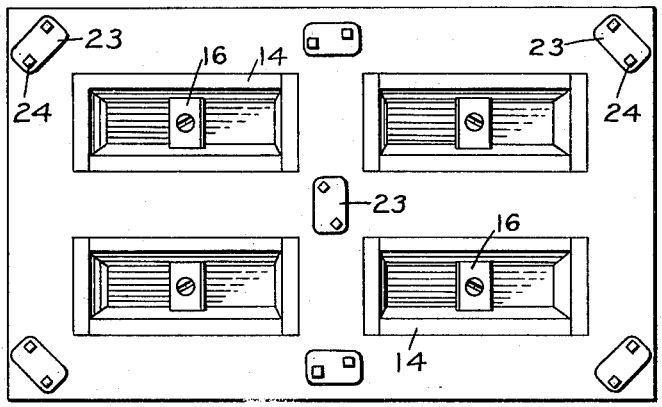
Figure 9 is a plan view of the templet showing parts of the form still in place, and attaching pads for the templet base secured to the templet.
Figure 10:
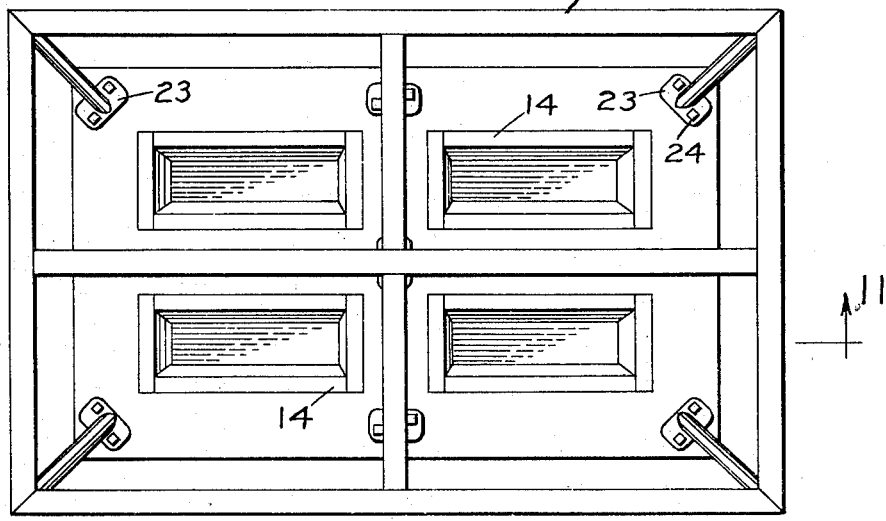
Figure 10 is a plan view showing the supporting base attached to the templet.
Figure 11:
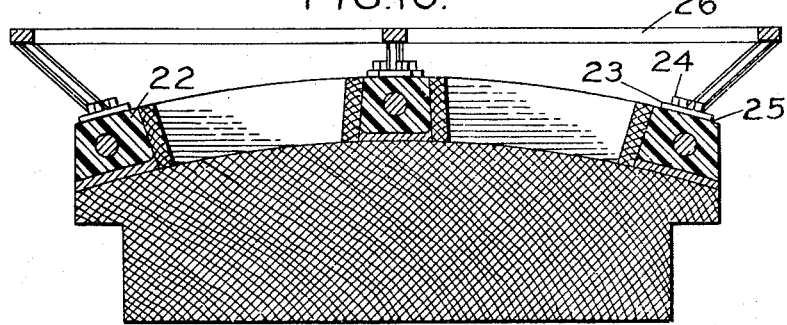
Figure 11 is a cross-sectional view taken on substantially the line 11—11 of Figure 10.

The form and hardened castings, designated by numeral 27, are removed from the oven. The side frame 12, strips 13, and canvas 22 are removed from the casting and the two edges which were made overside, by means of the strips 13. are carefully scraped to the exact size of the model. In other words, those parts of the casting between the ends thereof and the dotted lines I in Figure 8 are scraped away.

The boxes 14 can then be removed from the casting 27 and the casting lifted from the model. However, as the casting is to be mounted on a base or stand, it is preferred to do so before the casting is completely freed from the model and boxes, in order to eliminate possible damage to the casting.

Metal pads 23 are attached to the casting by means of lag screws 24. Sheets of asbestos 25 are placed between the pads 23 and the casting to cushion the latter and protect it from excessive heat due to welding. A base 26 consisting of a welded framework of metal bars is then welded to the pads 23.

Figure 12:
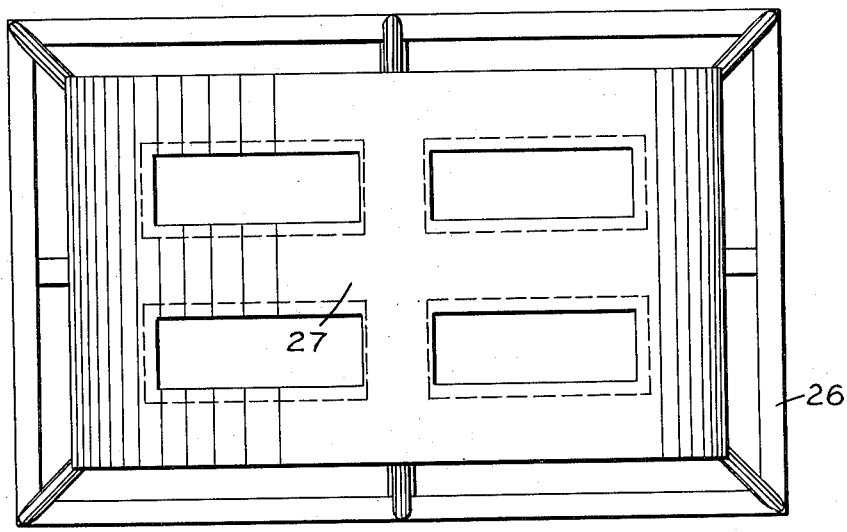
Figure 12 is a plan view of the completed templet in its normal position, which is inverted relative to the position in all previous views.
Figure 13:
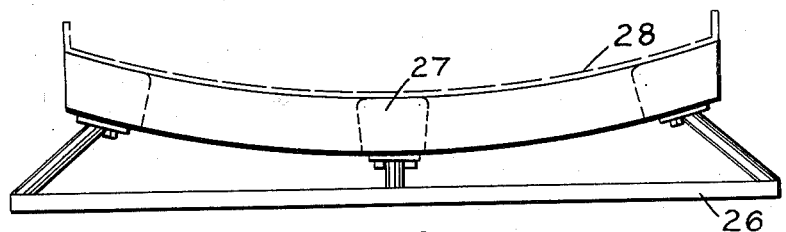
Figure 13 is a front elevational view of the completed templet.

The boxes 14 are removed. The finished templet is lifted from the model and inverted so that it will be supported in its normal position of use. See Figures 12 and 13. The completed templet is now ready for checking a metal part in the manner indicated in Figure 13.

The ribbed construction of the templet is particularly advantageous, as it permits viewing of portions of the metal part next to the templet through the rectangular openings in the templet, from the underside of the latter. In this way it can be easily determined whether or not the part contacts the templet as it should.

A templet for checking "inside of metal" is made in the same way as that described above, by omitting the sheets of wax 17. The model surface is coated with lacquer and parting agent and the plastic poured directly against the model.

From the foregoing it will be seen that the present invention provides a novel method of producing a large number of templets, all alike, in an extremely simple and economical manner. The finished templets will withstand a great deal of abuse, to which such templets are subjected, yet they are relatively light in weight. The basic process can be utilized to make either "inside of metal" or "outside of metal" checking templets with but a change in one step.

The scope of the invention is indicated in the appended claims.

I claim:

1. The method of making a checking fixture for checking dimensions of sheet metal objects which comprises providing a master model of one of said objects, attaching to said model upstanding walls which together with the model provide a form, placing flexible sheets of sheet material of uniform thickness equivalent to the thickness of the sheet metal in said object on said model between said upright walls, said sheet material being of a size to contact said walls throughout the entire perimeter of said forms, casting fluid thermosetting plastic into said form, hardening said plastic to form a solid casting, and thereafter removing said form and sheet material from said casting.

2. The method of making a checking fixture for checking the dimensions of sheet metal objects which comprises providing a master model of such object, attaching to said model upstanding walls which together with the model provide a form, placing sheets of sheet material of uniform thickness equivalent to the thickness of said sheet metal object on said model in contact therewith between said upright walls, said sheet material being of a size to contact said walls throughout the interior perimeter of said form, thereafter coating the interior surfaces of said walls and the surface of said sheet material remote from said model with a parting agent, casting fluid thermosetting plastic into said form, hardening said plastic to form a solid casting, and thereafter removing said form and sheet material from said casting.

3. The method of making a checking fixture for checking dimensions of identical sheet metal objects which comprises providing a master model of such objects, attaching to said model upstanding walls which together with the model provide a form, covering the surface of said model within the boundaries defined by said upstanding walls with sheet material of uniform thickness equivalent to the thickness of the metal in said objects, casting fluid plastic into said form, hardening said plastic to form a solid casting, and thereafter removing from said casting the form and sheet material.

HAROLD E. RENAUD.

REFERENCES CITED

The following references are of record in the file of this patent:

UNITED STATES PATENTS

| Number | Name | Date |
| --- | --- | --- |
| 1,868,788 | Zinser | July 26, 1932 |
| 2,039,105 | Naery | Apr. 28, 1936 |
| 2,189,154 | Stewart | Feb. 6, 1940 |
| 2,256,247 | Groehn | Sept. 16, 1941 |
| 2,376,244 | Freeman | May 15, 1945 |
| 2,392,804 | Basolo | Jan. 15, 1946 |

OTHER REFERENCES

Ser. No. 342,900, Fickert (A. P. C.), published Aug. 27, 1943.